United States Patent [19]

Miyake et al.

[11] Patent Number: 4,727,443
[45] Date of Patent: Feb. 23, 1988

[54] METHOD OF PROTECTING A MAGNETIC RECORDING MEDIUM IN A MAGNETIC RECORDING/PLAYBACK SYSTEM AND APPARATUS THEREFOR

[75] Inventors: Izumi Miyake; Kiyotaka Kaneko, both of Kawasaki; Kazuya Oda, Tokyo, all of Japan

[73] Assignee: Fuji Photo Film Co., Ltd., Kanagawa, Japan

[21] Appl. No.: 894,021

[22] Filed: Aug. 7, 1986

[30] Foreign Application Priority Data

Aug. 14, 1985 [JP] Japan .................... 60-177580

[51] Int. Cl.$^4$ ............................ G11B 5/012
[52] U.S. Cl. ....................... 360/75; 358/909
[58] Field of Search ................ 360/75; 358/909

[56] References Cited

U.S. PATENT DOCUMENTS 4,445,188 4/1984 Barrett .................. 360/75
4,614,984 9/1986 Tezuka .................. 360/75

FOREIGN PATENT DOCUMENTS 54-119902 9/1979 Japan ..................... 360/69

OTHER PUBLICATIONS

Patent Abstracts of Japan Kokai No. 55-43681, 3/27/80 Takagi.

Primary Examiner—George G. Stellar
Attorney, Agent, or Firm—Lowe Price LeBlanc Becker & Shur

[57] ABSTRACT

A method of protecting a magnetic recording medium includes measuring a time period over which a main power supply continues to remain in an off state and the magnetic recording medium continues to remain loaded at a predetermined position. If the measured time period attains a predetermined time period (e.g. 60 minutes), a magnetic recording/playback head is shifted to an origin position or a stand-by position outside a recording/playback area of the recording medium, thereby preventing the magnetic head from leaving its impression on the magnetic recording/playback area of the recording medium due to continuous pressing contact between the two.

6 Claims, 11 Drawing Figures

| HP No.1 2 3 4 | 48 49 50 |
| OUTER SIDE | INNER SIDE |

METHOD OF PROTECTING A MAGNETIC RECORDING MEDIUM IN A MAGNETIC RECORDING/PLAYBACK SYSTEM AND APPARATUS THEREFOR

BACKGROUND OF THE INVENTION

This invention relates to a method and apparatus for protecting a rotating magnetic recording medium (hereafter referred to as a "magnetic disk") in a magnetic recording/playback system which is capable of recording a signal on any track on a magnetic disk, or of playing back a signal from any track on the disk, or of both these recording and playback operations, by moving a magnetic recording/playback head in the radial direction of the magnetic disk.

Electronic still camera systems have recently been developed. These systems combine an imaging device such as a solid state imaging element or image pickup tube with a recorder that employs an inexpensive magnetic disk of a comparatively large storage capacity as a storage medium and operate by electronically imaging a subject, recording a still picture of the subject on the magnetic disk and reproducing the recorded picture by a separately provided television system or printer. A video magnetic recording system has also been realized in which a still picture recorded on a visible recording medium such as ordinary film or photographic paper is imaged and recorded on a magnetic disk.

In systems of this kind, a video signal is recorded on the magnetic disk or read from the magnetic disk not by merely contacting the magnetic recording/playback head with the recording surface of the disk lightly but by pressing the head against the disk surface so strongly that the disk is partially deformed. Since the magnetic disk has some flexibility and therefore returns to its original state even when somewhat deformed, no problems are encountered even though the magnetic head is pressed against the rotating magnetic disk at recording or playback. However, when rotation of the magnetic disk is halted and the magnetic head is held in abutting contact with one location on the stationary magnetic disk, the portion of the disk in contact with the magnetic head becomes permanently deformed and is scarred or left with an impression of the head if such contact is allowed to continue for an extended period of time (e.g. for several hours to several days). This is especially likely to occur in the abovementioned video magnetic recording system or video playback system in which, after recording or playback, the system power supply is turned off without returning the magnetic head to a predetermined origin, e.g. a home position. The magnetic head remains on the disk track at which recording or playback was last taking place because power for returning the magnetic head to the origin position will no longer be available if the power supply is turned off, and because the magnetic disk will also be at rest.

SUMMARY OF THE INVENTION

An object of the present invention is to provide a method of protecting a magnetic disk, whereby it is possible to prevent an impression of a magnetic head from being left on a recording/playback track of a magnetic disk in a case where the head has been left in abutting contact with the track.

Another object of the present invention is to provide an apparatus for practicing the method of the invention.

The magnetic disk protection method of the present invention finds use in a magnetic recording/playback system for recording a signal on any track on a magnetic disk, or for playing back a signal from any track on the disk, by moving a magnetic recording/playback head radially of the magnetic disk while the disk is rotating. The method of the invention is characterized by the following steps, which are executed by a control unit operated on electric power from an auxiliary power supply:

(a) sensing that a main power supply, which supplies power to the magnetic recording/playback system with the exception of the control unit, has been turned off;

(b) sensing that the magnetic disk has been loaded at a predetermined position;

(c) measuring a time period over which the main power supply continues to remain in an off state and the magnetic disk continues to remain loaded at the predetermined position, and determining whether the measured time period has attained a predetermined time period; and (d) shifting the magnetic head to an origin position outside a recording/playback area of the magnetic recording medium when it is determined at the step (c) that the measured time period has attained the predetermined time period.

The predetermined time period is set to about 60 minutes or more. In a preferred embodiment, a warning tone is issued or a warning lamp is lighted when it is determined at the step (c) that the measured time period has attained the predetermined time period.

In an embodiment, it is determined whether the magnetic head is located at the origin position, with step (d) being executed if the head is not at the origin position.

According to the method of the invention, the magnetic head is returned to the origin position or a standby position outside the magnetic recording/playback area of the magnetic disk if the main power supply remains off continuously and, moreover, the magnetic disk remains loaded at the predetermined position continuously, over the predetermined time period. As a result, a situation is avoided in which the magnetic head remains at the same location on the magnetic disk for an extended period of time, thus preventing the head from scarring or leaving its impression on the magnetic disk due to the pressing contact between the two. Since the origin position to which the magnetic head is returned is located outside the recording/playback area, namely outside the region covered by the tracks, recording and/or playback of the video signal will not be particularly affected if the magnetic head should happen to leave its impression at this location of the magnetic disk.

These and other characterizing features of the present invention will become clear from a description of preferred embodiments with reference to the accompanying drawings.

DETAILED DESCRIPTION OF THE PREFERRED EMBODIMENT

An embodiment of the present invention will be described in detail in accordance with the following Table of Contents:

TABLE OF CONTENTS (1) External appearance an operating mechanism of video signal playback apparatus
(2) Electrical constructional of video playback apparatus
(3) Control processing executed by control unit
   (3.1) Ordinary processing
   (3.2) Magnetic disk protection processing
   (3.3) Other processing
(4) Modifications and other embodiments The preferred embodiment described herein illustrates the present invention applied to an apparatus for playing back a video signal recorded on a magnetic disk. The magnetic disk is provided with a plurality (e.g. 50) of circular, concentrically disposed tracks having a track pitch of e.g. 100 μm. Magnetically recorded on each track is a frequency-modulated color video signal (inclusive of luminance and chrominance signals, etc.) corresponding to one field or one frame. The apparatus has a magnetic playback head freely movable in the radial direction of the magnetic disk for reading the video signals recorded thereon and is adapted to sense a designated track on the magnetic disk and to read the video signal from that track while the disk is rotating.

Figure 1:
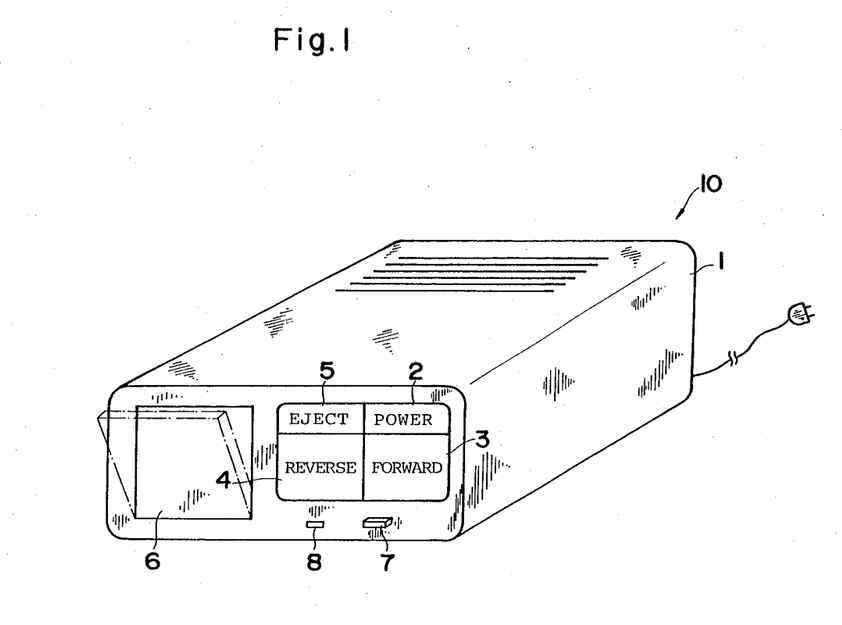
FIG. 1 is a perspective view illustrating the external appearance of a video signal playback apparatus.

(1) External appearance and operating mechanism of the video signal playback apparatus FIG. 1 illustrates the external appearance of the video signal playback apparatus, which is designated generally at numeral 10. The apparatus 10 has a case 1 whose front side is divided into right- and left-hand sections. The right-hand section is provided with a power supply switch 2 for introducing electric power from a main power supply to various components, circuits and devices with the exception of a control unit 40 (FIG. 6) described below; a forward switch 3 for inputting a command which will feed a magnetic head 12, described below, from the outer side toward the inner side of a magnetic disk 11 one track at a time; a reverse switch 4 for feeding the magnetic head 12 in the reverse direction, namely from the inner side to the outer side of the disk 11 one track at a time; a mechanical eject switch 5, which is devoid of electrical contacts, for opening a bucket 6; a track number display switch 7 for displaying, on a playback screen, the number (track No.) of a track presently being played back by the magnetic head; and a warning indicator lamp 8 comprising an LED (light-emitting diode). The left-hand section on the front of case 1 is provided with the aforementioned bucket 6, which is capable of being opened and closed at will, for loading a magnetic disk pack 20 (FIGS. 2 and 4), described below, incorporating the magnetic disk. Pressing the eject switch 5 opens the bucket 6, as illustrated by the phantom lines in FIG. 1, to allow insertion of the disk pack 20. After the disk pack has been inserted, the open bucket 6 is pushed by hand back to its closed position to load the disk pack. The bucket 6 is automatically locked at this position.

Figure 6:
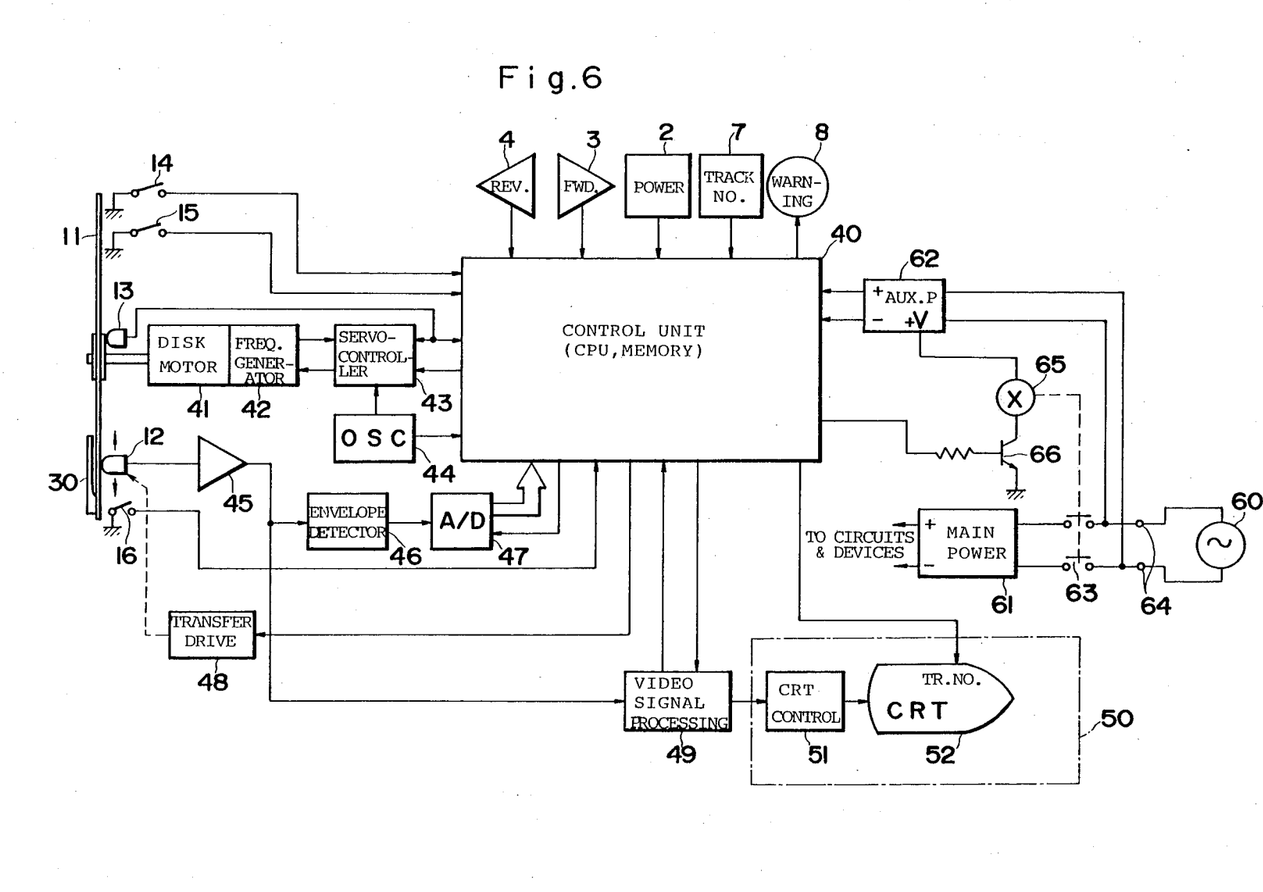
FIG. 6 is a block diagram illustrating the electrical construction of the video signal playback apparatus.

The left side of FIG. 6 shows the magnetic disk 11 loaded on the spindle of a disk motor 41. The bucket 6 and disk pack 20 are not shown. Since the magnetic disk 11 is secured to the spindle at its center, the outer periphery of the magnetic disk 11 tends to undulate while the disk is rotated. To prevent this and maintain good contact between the magnetic head 12 and the surface of the magnetic disk 11 at all times, a retaining plate 30 is provided in contact with the outer circumferential portion of the loaded magnetic disk 11. Arranged on the other side of the magnetic disk 11 opposite the retaining plate 30 is the magnetic head 12 adapted to be moved freely radially of the magnetic disk 11. The magnetic disk 11 has a core to which is contacted a phase sensor 13 for genrating a single electrical pulse each time the magnetic disk 11 makes one full revolution. The other components constituting the apparatus of FIG. 6 will be described later.

Figure 2:
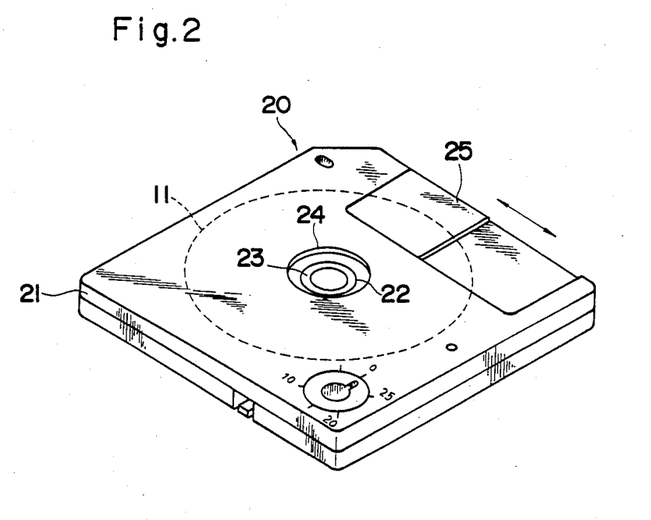
FIG. 2 is a perspective view illustrating the external view of a magnetic disk pack.

FIG. 2 illustrates the aforementioned magnetic disk pack 20, which is for being inserted into the bucket 6. The disk pack 20 has a case 21 for accommodating the magnetic disk 11, which is thin and of a small diameter, in such a manner that the disk 11 is capable of being rotated within the pack. Formed in the case 21 at substantially the central portion thereof is a circular opening 24 designed so that a hub or core 22 located at the center of the magnetic disk 11 is exposed at the opening 24. A portion of the core 22 is formed to include a magnetic body 23 sensed by the phase sensor 13. One side edge of the disk pack 20 is provided with a shutter 25 capable of back-and-forth movement in a direction parallel to this edge.

Figure 3:
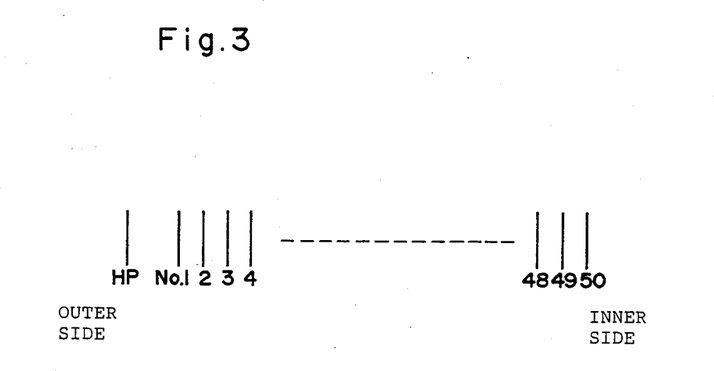
FIG. 3 is a view showing the disposition of tracks on a magnetic disk as well as the location of a home position.

FIG. 3 illustrates the relationship between the tracks provided on the magnetic disk 11 and a home position HP (an origin position or a stand-by position) of the magnetic head 12. The 50 tracks are circular and concentrically disposed on a magnetic recording surface of the magnetic disk 11 and are numbered consecutively from No. 1 to No. 50 starting from the outer side of the disk. The home position HP, which is situated on the outer side of track No. 1, is not attached to the magnetic disk 11 but is a limit position assigned to the path along which the magnetic head 12 travels. The home position HP is sensed by a home position switch 16 (FIG. 6). More specifically, the switch 16 is a limit switch, photoelectric switch or other switch for sensing the magnetic head 12 or a portion accompanying the head 12.

Figure 4:
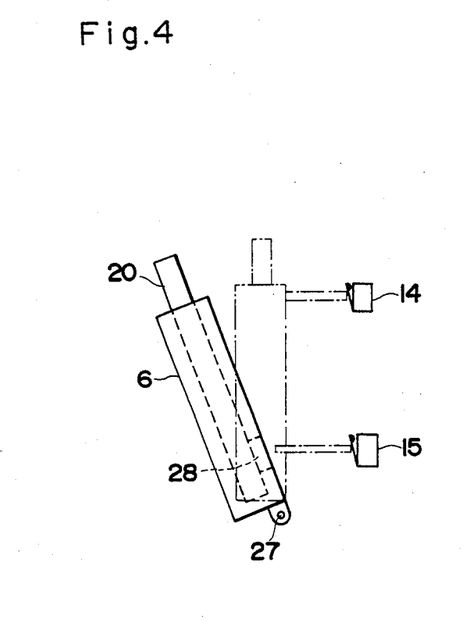
FIG. 4 is a schematic view showing a bucket, a disk pack accommodated within the bucket, and sensors located at the periphery of the bucket.

FIG. 4 schematically illustrates the bucket 6, the disk pack 20 inserted into the bucket 6, and peripheral components associated therewith. The bucket 6 is pivoted at its lower edge by means of a pin 27 so as to be capable of tilting forward through a prescribed angle. An opening 28 is formed on the inner side of the bucket 6 at its lower portion. Provided inside the playback apparatus at the position occupied by the bucket 6 are a loading switch 14, which is actuated by the bucket 6 via an appropriate mechanism (not shown), and a pack switch 15 which passes through the opening 28 to be actuated by the disk pack 20 inside the bucket 6 through an appropriate mechanism, also not shown. These switches 14, 15 are also constituted by a limit switch, photoelectric switch or the like. The bucket 6 internally incorporates a mechanism (not shown) for automatically opening and closing the shutter 25 of the disk pack 20. The inner side of the bucket 6 also is open at its central portion. The above mentioned retaining plate 30 is provided inside the bucket 6.

When the bucket 6 is tilted forward to the open position by the reject switch 5 and the disk pack 20 is inserted into the bucket 6 from the opening at its upper side, the shutter 25 is opened by the abovementioned opening and closing mechanism, thereby exposing an opening (not shown) which, until now, has been kept closed by the shutter 25. The retaining plate 30 passes through the opening to abut against the magnetic disk 11.

Thereafter, when the bucket 6 is pushed by hand back to its closed and locked position, indicated by the phantom lines in FIG. 4, the distal end of the spindle of disk motor 41 is chucked in the core 22 of magnetic disk 11 by passing through the opening at the center of bucket 6 and the opening 24 in disk pack 20. This causes the magnetic disk 11 to be loaded at a predetermined position and enables the disk 11 to be rotated by the motor 41. In addition, the magnetic head 12 is allowed to pass through the opening exposed by opening the shutter 25 in order to contact the surface of the magnetic disk 11.

When the bucket 6 has been closed and locked at a predetermined position, the loading switch 14 detects the fact by closing, i.e. turning on. If the disk pack 20 is contained in the locked bucket 6, the pack switch 15 senses the fact by turning on. Thus, if the bucket 6 is open, the loading switch 14 is in the off (open) state. If the bucket 6 is locked at the predetermined position but does not contain an inserted disk pack, the pack switch 15 is in the off state.

Figure 5:
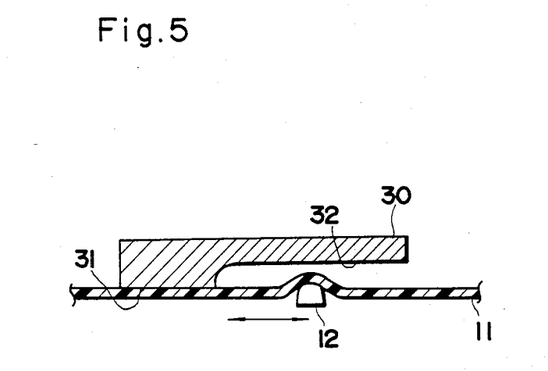
FIG. 5 is a sectional view showing a magnetic disk and a retaining plate.

FIG. 5 shows the positional relationship among the magnetic disk 11, which has been loaded at the predetermined position, the retaining plate 30 and the magnetic head 12. The magnetic head 12 is situated on the magnetic recording surface-side of the magnetic disk 11, and the retaining plate 30 is located at the same position as the head 12 but on the opposite side of the disk 11. The retaining plate 30 has a guide face 31 in contact with the circumferential portion of the magnetic disk 11. The retaining plate 30 is formed to include a recess 32 extending over the traveling range of magnetic head 12, namely from the home position HP to a point somewhat beyond track No. 50 in FIG. 3. Accordingly, when the magnetic head 12 travels radially of the magnetic disk 11, it will not press against the retaining plate 30 owing to the recess 32. As shown in exaggerated form in FIG. 5, the magnetic head 12 is in pressured contact with the magnetic recording surface of magnetic disk 11 to such an extent that the disk 11 is caused to protrude slightly toward the retaining plate 30.

(2) Electrical construction of the video signal playback apparatus

With reference to FIG. 6, the operation of each of the components constituting the video signal playback apparatus, as well as the overall operation of the appratus, is under the control of a control unit 40. The latter comprises a central processor, preferably a microprocessor (hereafter referred to as a "CPU"), a memory for storing a program run by the CPU and necessary data, and an interface for providing a connection to peripheral elements, circuits and devices.

The abovementioned power supply switch 2, forward switch 3, reverse switch 4, track number display switch 7, loading switch 14, pack switch 15 and home position switch 16 are connected to the control unit 40, which reads in the on/off status of each of these switches. The warning indicator lamp 8 is lighted by a command produced by the control unit 40 when predetermined conditions ar dissatisfied.

The disk motor 41 is provided with a frequency generator 42 for generating an output signal the frequency whereof is proportional to the rotational speed (rpm) of the motor 41. This output signal is fed back to a servocontrol circuit 43. The output pulses from the phase detector 13 are also applied to the servocontrol circuit 43 and to the control unit 40. A reference clock pulse generator 44 generates a reference signal (synchronizing signal) having a frequency of 60 Hz, which is the same as the field frequency of a raster scan video signal recorded on the magnetic disk 11. This signal is applied to the servocontrol circuit 43. The generator 44 also supplies the control unit 40 with high-speed (e.g. 3.58 MHz) clock pulses. On the basis of these input signals applied thereto, the servocontrol circuit 43 sychronizes the phase of rotation of the disk motor 41 to the reference clock pulses and also controls the speed of the motor 41 so that it will rotate at a fixed, constant speed of, e.g. 3600 rpm. The servocontrol circuit 40 also responds to commands from the control unit 40 to start and stop the motor 41.

A transfer drive controller 48 is provided for supporting the magnetic head 12 in such a manner that the head 12 may travel freely radially of the magnetic disk 11, and for controlling the travel of the head 12 radially of the disk. On the basis of inputs from the forward and reverse switches 3, 4 and the results of processing executed by the control unit 40, the latter provides the controller 48 with commands regarding the direction in which the magnetic head 12 is to be moved and the amount of such movement. The controller 48 includes a stepping motor (not shown) for moving the magnetic head 12 by an amount proportional to the angle through which the motor is rotated. By way of example, for each drive pulse applied to the stepping motor, the motor rotates through about 15°, whereby the magnetic head 12 is shifted by about 4.2$\mu$. This allows the magnetic head 12 to be moved with great precision.

The magnetic head 12 serves to read a video signal recorded on a track at which the head 12 has been positioned by the controller 48. Since the magnetic disk 11 is rotated at a constant 3600 rpm in the illustrated embodiment, the magnetic head 12 plays back a video signal corresponding to one track, namely a frequency-modulated video signal of one field, every revolution, i.e., every 1/60 of a second. This is to establish compatibility with a standard color television system, such as the NTSC system, upon demodulation.

The playback output of the magnetic head 12 is fed into a video signal processing circuit 49 and an envelope detector circuit 46 after being amplified by a preamplifier 45. The video signal processing circuit 49 subjects the video signal read by the magnetic head 12 to signal processing to produce a composite video color signal in e.g. an NSTC format. The processing circuit 49 also functions to extract a vertical synchronizing signal VSYNC from the demodulated NTSC-format composite color video signal and deliver it to the control unit 40. The circuit 49 responds to a signal MUTE from the control unit 40 by performing a muting operation.

The color video signal outputted by the circuit 49 is applied to a color television system 50 having a cathode-ray tube display (hereafter referred to as a "CRT") 52 and a CRT control circuit 51. A still picture produced by a video signal recorded on the magnetic disk 11 appears visually on the screen of the CRT 52.

The envelope detector circuit 46 detects the envelope of the signal read by the magnetic head 12, namely the envelope of the frequency-modulated video signal recorded on a track of the magnetic disk 11, and outputs a voltage signal conforming to the detected envelope. This voltage signal representing the envelope is fed into an analog/digital (A/D) converter 47, which proceeds to convert the signal into an eight-bit digital signal representing a quantization level of e.g. 256. This signal enters the control unit 40.

The envelope detection signal is used to search for tracks on the magnetic disk 11. Specifically, a position at which the detection signal peaks when the magnetic head 12 is moved in the radial direction of the magnetic disk 11 is the center of a track on which a video signal has been recorded. On the basis of this eight-bit digital signal received from the A/D converter 47, the control unit 40 controls the magnetic head transfer drive controller 48 to position the magnetic head 12 at the center of a prescribed track.

The track number can be detected by moving the magnetic head 12 from the home position HP toward the center of the magnetic disk 11 and counting the number of peaks in the detected envelope. When a signal calling for a display of the track number enters from the track number display switch 7, the detected track number is applied to the CRT 52 and is displayed on the CRT screen at, say, a position located at the upper right corner of the screen.

The video signal playback apparatus shown in FIG. 6 is supplied with electric power from a commercial power supply 60 in the illustrated embodiment. The playback apparatus has two power supply circuits 61, 62 connected to power input terminals (a plug for insertion in an outlet) 64, which are for being connected to the commercial power supply 60. The circuit 61 is a main power supply circuit for supplying operating power to the above-described circuits and devices exclusive of the control unit 40 and television system 50, namely to the disk motor 41, servocontrol circuit 43, envelope detector circuit 46, transfer drive controller 48, etc. The other circuit 62 is an auxiliary power supply circuit for supplying operating power solely to the control unit 40. The power supply circuits 61, 62 each include such components as an AC converter and a stablizer.

The auxiliary power supply circuit 62 is connected directly to the input terminals 64 (it being understood, of course, that a safety device such as a fuse, not shown, is present in the line between the circuit 62 and the terminals 64), so that the control unit 40 is supplied with operating power as soon as the terminals 64 are connected to the commercial power supply 60. The main power supply circuit 61, on the other hand, is connected to the input terminals 64 via normally open contacts 63. When a switching transistor 66 is turned on by a main power supply turn-on command outputted by the control unit 40, a relay 65 is actuated to close the contacts 63. As will be described below, in principle the contacts 63 are closed in response to an input from the power supply switch 2 when this switch is pressed. In exceptional cases, however, the contacts 63 can also be closed in response to a decision made by the control unit 40. It goes without saying that the function of the contacts 63 can be implemented by using a contactless switch.

(3) Control processing executed by the control unit (3.1) Ordinary processing

Figure 7A:
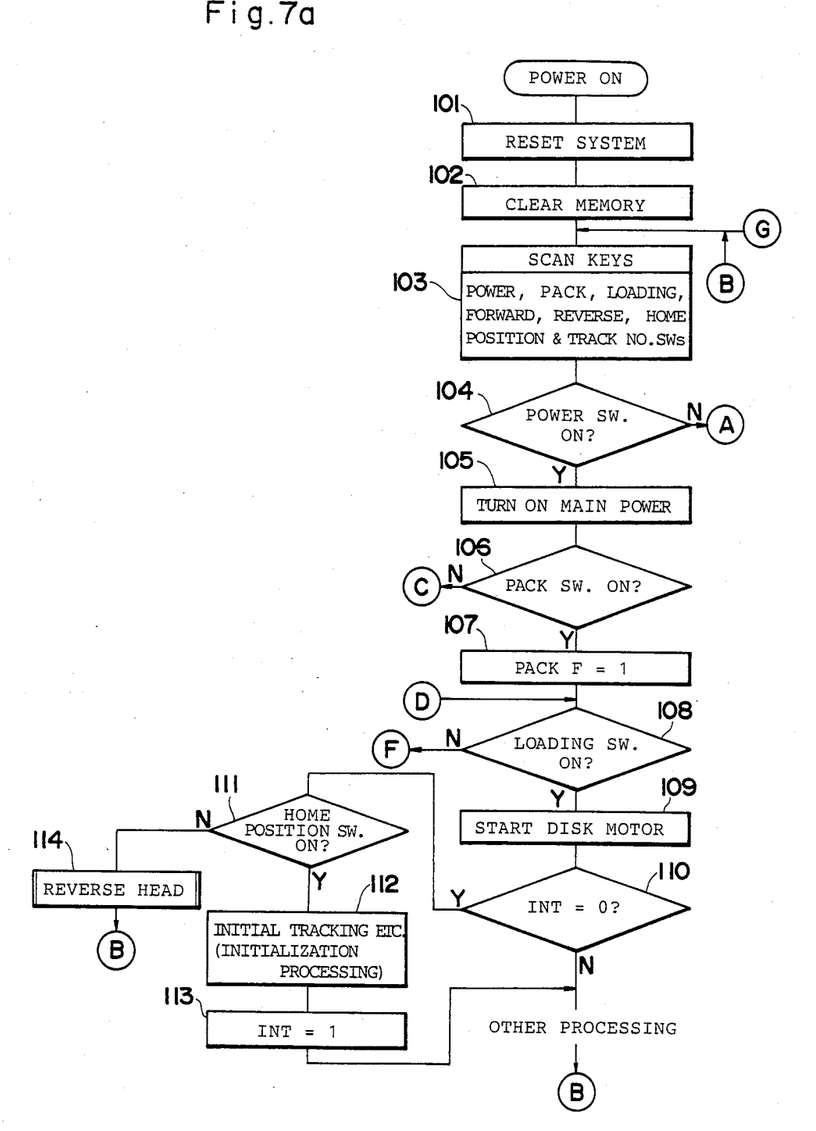
FIGS. 7a to 7c are flowcharts of processing executed by a control unit shown in FIG. 6.
Figure 7B:
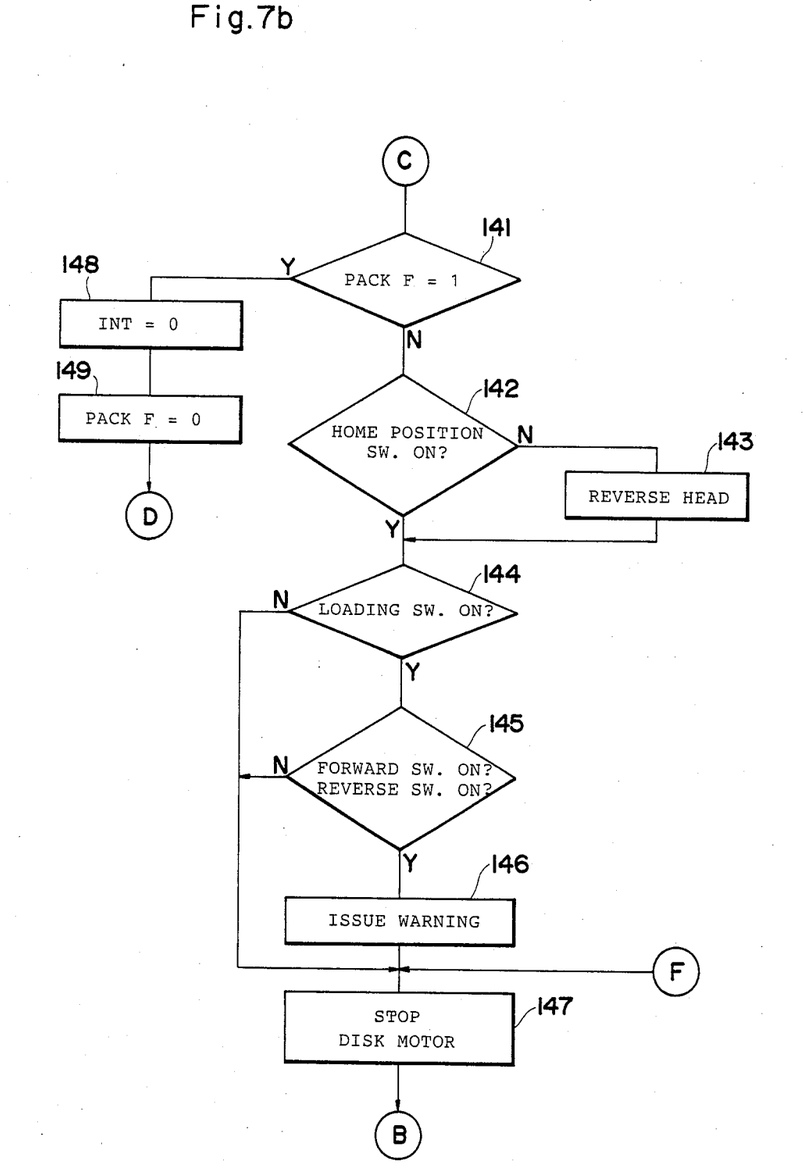
Figure 7C:
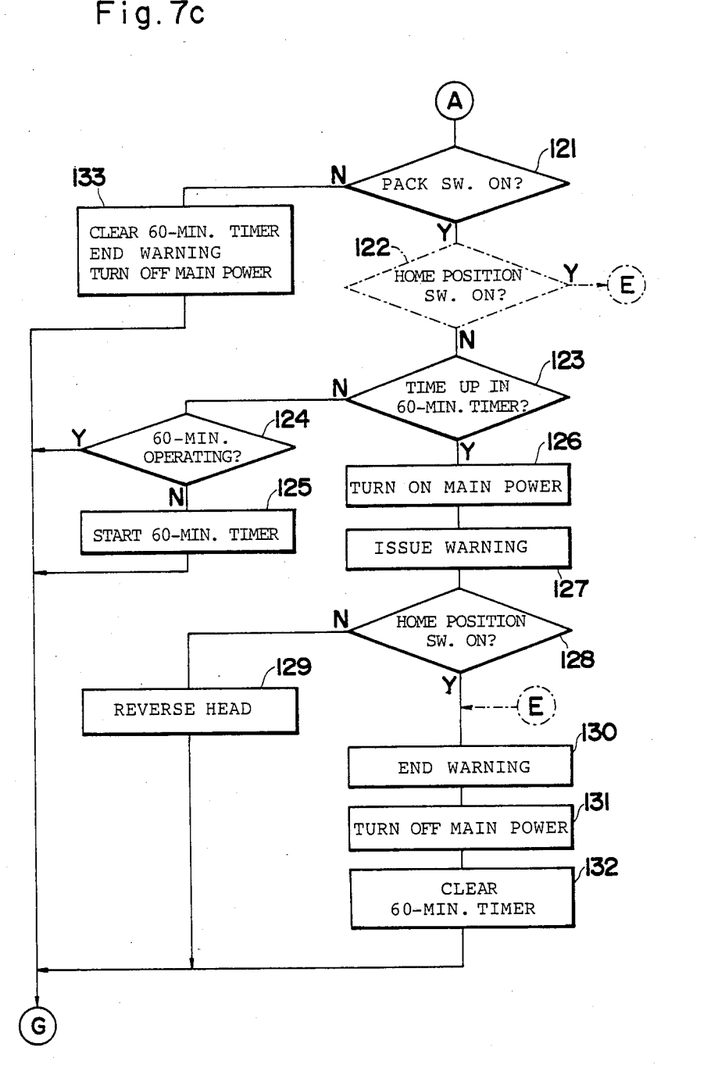

The flowcharts of FIGS. 7a to 7c illustrate a portion of the control processing executed by the control unit 40. The processing routine is executed repeatedly at a period of e.g. 1/60 of a second.

When the power input termnals 64 are connected to the commercial power supply 60, the control unit 40 is supplied with the necessary electric power by the auxiliary power supply circuit 62 and begins operating as a result. After executing steps 101 and 102 for system reset processing and processing for clearing a necessary data area in the control unit memory, respectively, the control unit 40 proceeds to a step 103 to execute key scan processing.

Key scan processing consists of reading the status (on or off) of the power supply switch 2, forward switch 3, reverse switch 4, track number display switch 7, loading switch 14, pack switch 15 and home position switch 16, and storing the status of each switch as e.g. a flag in the memory of the control unit 40. Hereafter, the term "switch" will be abbreviated to "SW".

When the video signal playback apparatus is in use, ordinarily the power supply SW 2 is in the on state, the disk pack 20 is inserted in the bucket 6 and the bucket 6 is locked in the closed position. Accordingly, the lock SW 14 and the pack SW 15 ordinarily are in the on state.

If the power supply SW 2 is found to be on, giving a YES answer at a step 104, the program proceeds to a step 105, at which the control unit 40 issues the main power supply turn-on command to drive the transistor 66 into conduction, thereby actuating the relay 65 and, hence, closing the contacts 63. As a result, the main power supply 61 is connected to the commercial power supply 60, so that operating power is supplied to the circuits and devices of the playback apparatus with the exception of the control unit 40.

Next, if the pack SW 15 is found to be in the on state, giving a YES answer at a step 106, the control unit 40 sets a pack flag (pack F) to "1" at a step 107. Next, if the loading SW 14 is found to be ON (YES at step 108), the control unit 40 outputs a command for starting the driving of the disk motor 41 at a step 109. Since the main power supply 61 is already operating, the servocontrol circuit 43 also is supplied with power, thus making it possible to start the motor 41.

A initial flag (INT) indicates whether the apparatus has undergone initialization processing and is reset to "0" if such processing has not yet been executed. Initialization processing includes moving the magnetic head 12 from the home position HP toward the center of the magnetic disk 11 to search for track No. 1 (this is referred to as "initial tracking processing"), as well as other processing. If INT="0", giving a YES decision at a step 110 (meaning that initialization has not taken place), then it is determined at a step 111 whether the home position SW 16 is on. If the answer at step 111 is NO, then this means that the magnetic head 12 is at a location other than the home position HP. Accordingly, the control unit 40 issues a head reversal command, in response to which the transfer drive controller 48 returns the magnetic head 12 to the home position HP at a step 114.

The home position SW 16 turns on at the completion of magnetic head reversal. If the home position SW 16 is found to be on at the step 111, initialization processing, inclusive of initial tracking processing, is executed at a step 112. Initial tracking processing consists of moving the magnetic head 12 toward the center of the magnetic disk 11 to search for track No. 1 and then stopping the magnetic head at the position of track No. 1. This entails moving the magnetic head 12 from its home position HP to a position at which the output signal from the envelope detector circuit 46 develops it first peak value. This is followed by setting INT to "1" at a step 113. When the magnetic head 12 is situated at track No. 1, the still picture recorded on this track is displayed on the CRT 52 based on the signal read by the magnetic head 12.

After INT is set to "1", or if INT already is at value "1", other processing assigned to the apparatus is executed. Though this other processing will not be described in detail, it includes processing for displaying the track number, moving the magnetic head forward, moving the magnetic head in reverse, etc. In track number display processing, if the track number is being displayed on the CRT 52 when the track number display SW 7 is turned on, the number is erased from the CRT. If a track number is not being displayed when the SW 7 is turned on, the CRT 52 displays the number of the track on which the still picture presently being displayed has been recorded. Magnetic head forward processing consists of moving the magnetic head 12 further toward the center of the magnetic disk from its present position in order to search for the next, immediately adjacent track, and positioning the magnetic head 12 at this track. Magnetic head reverse processing entails moving the magnetic head 12 by one track in the direction opposite to that just described.

It will readily be understood that, by way of the foregoing processing steps, a video signal recorded on a desired track may be reproduced and the corresponding still picture displayed on the screen of the CRT 52.

(3.2) Magnetic disk protection processing

If the operator runs the video signal playback apparatus by using the forward and reverse SWs 3, 4 and then turns off the power supply SW 2 and leaves the SW 2 in the off position, this can result in the problem mentioned earlier. Specifically, assume that the disk pack 20 has been left in the bucket 6, and that the bucket 6 has been left in the locked position. Also, assume that the magnetic head 12 has come to rest at a position on a track and not at the home position HP. As shown in exaggerated form in FIG. 5, the magnetic head 12 is in pressured abutting contact with the magnetic disk 11 so that this portion of the disk 11 is caused to protrude or bulge toward the retaining plate 30. If the magnetic disk 11 is being rotated at high speed, the portion thereof that is deformed by contact with the magnetic head 12 moves with the passage of time and no harm is done. However, if the magnetic disk 11 remains at rest in the deformed state for an extended period of time (e.g. several hours or more), the deformed state becomes a permanent attribute of the disk. In other words, prolonged contact between the magnetic disk 11 and the magnetic head 12 in the manner described above causes an impression of the head 12 to be left on a portion of the magnetic recording surface of the disk. The next time the disk 11 is played back, therefore, the video signal may not be read correctly from this portion of the disk, with the risk of failing to reproduce a correct and clear picture on the CRT.

In accordance with the present invention, processing is executed for avoiding a situation such as that described in order to prevent the magnetic head 12 from leaving its impression on the magnetic disk 11, especially the region thereof possessing the tracks. This protective processing is a routine that starts with a step 121 and employs a 60-minute timer. The timer can be implemented either by using a predetermined area in the memory of control unit 40 as a timers or by being provided externally of the control unit CPU. If the memory is employed to realize the timer, time can be clocked in the routine of FIGS. 7a to 7c or, alternatively, time can be clocked by an interrupt routine run at a fixed interval.

If the power supply SW 2 is found to be off (NO at step 104), the program proceeds to the protective processing routine, which starts at the step 121. This step calls for a determination as to whether the pack SW 15 is on. If the SW 15 is found to be off at this step, this means that the disk pack 20 has not been loaded and, hence, that the processing for protecting the magnetic disk is unnecessary. The program therefore returns to the step 103. If the pack SW 15 is found to be on at the step 121, then a command for starting the 60-minute timer is issued, in response to which the timer begins measuring elapsed time at a step 125. If the 60-minute timer has already started measuring time (YES at a step 124), execution of step 125 is unnecessary.

If this condition continues for 60 minutes so that the 60-minute timer runs out of time, giving a YES answer at a step 123, the contacts 63 are closed at a step 126 by the power supply turn-on command. As a result, the main power supply circuit 61 supplies power to the various components of the apparatus other than the control unit 40, particularly to the magnetic head transfer drive controller 48, etc. Next, at a step 127, the warning indicator lamp 8 is ignited. It is then checked at a step 128 whether the home position SW 16 is on. When the magnetic head 12 is located at a track area, namely an area of the disk 11 other than that corresponding to the home position HP, the switch 16 is off. In a case such as this, a command for rever ing the magnetic head is outputted by the control unit 40. As a result, the magnetic head 12 is shifted toward the home position HP, located on the outside of the tracks, at a step 129. When the magnetic head 12 arrives at the home position HP, the switch 16 is turned on. Accordingly, a YES answer will be obtained at the step 128 from the next cycle of processing onward in the routine of FIGS. 7a to 7c.

If the home position SW 16 is on, the indicator lamp 8 is extinguished at a step 130, the contacts 63 open at a step 131, and the 60-minute timer is cleared at a step 132.

Thus, if the disk pack 20 remains in the bucket 6 and the main power supply remains off continuously for a predetermined time period (60 minutes) or more, a warning is issued and, if the magnetic head 12 is located in the track area of the magnetic disk 11, the head 12 is returned to the home position HP. This is permissible because reproduction of the video signal will not be significantly affected if the magnetic head 12 leaves its impression on the portion of the magnetic disk 11 corresponding to the home position HP. Thus, the magnetic head 12 is prevented from leaving its impression on the track area of the magnetic disk 11.

If the operator removes the disk pack 20 from the bucket 6 upon noticing lighting of the warning inicator lamp 8 or for some other reason, the processing now being executed is ended (step 133). However, it is preferred that the processing for turning off the main power supply be inhibited when the magnetic head 12 is in the course of being moved in the reverse direction (step 129), and that the main power supply be turned off after the magnetic head 12 has returned to the home position HP.

Though a 60-minute timers is used in the embodiment described above, it goes without saying that the time period can be set at will. Further, step 127, namely the lighting of the warning indicator lamp 8, is not absolutely necessary.

It can be so arranged that the protective processing will not be executed if the magnetic head 12 is at the home position HP. This is a step 122, which is indicated in phantom in FIG. 7c.

(3.3) Other processing

Let us briefly describe processing executed to deal with other abnormal conditions.

For instance, assume that the forward SW 3 or reverse SW 4 is turned on without the disk pack 20 having first been loaded in the bucket 6. In such case, the warning indicator lamp 8 is lit through processing which will now be described.

If the disk pack 20 has not been loaded in the bucket 6, the pack SW 15 is in the off state, so that processing proceeds from the step 106 to a step 141. Assume that the pack F is "0" (NO at the step 141). This is followed by a step 142, at which the status of the home position SW 16 is checked. If the SW 16 is off, the program proceeds to a step 143, at which the magnetic head 12 is fed in the reverse direction in order to be returned to the home position HP. If the home position SW 16 is found to be on at the step 142, the status of the loading SW 14 is checked at a step 144. If SW 14 is off, this means that the bucket 6 has been opened. Accordingly, no problem is encountered even if the disk pack SW 15 is off. The program therefore returns to a step 147, at which the disk motor 41 is stopped.

If the loading switch 14 is found to be on at the step 144, this means that the bucket 6 has been locked in position without the disk pack 20 having been inserted in the bucket. Therefore, if the forward SW 3 or reverse SW 4 is on at this time (YES at a step 145), the warning indicator lamp 8 is ignited at a step 146.

If the pack F is found to be "1" at the step 141, this means that after the disk pack 20 was inserted in the bucket 6 and the bucket 6 locked in position (steps 106, 107), the bucket 6 was opened or the disk pack 20 was extracted following opening of the bucket. Since initialization processing again becomes necessary in such a case, INT is reset to "0" at a step 148, and the pack F is reset to "0" at a step 149.

When the loading SW 14 is found to be off at the step 108, if the disk motor 41 is being driven, rotation of the motor is halted at the step 147.

(4) Modifications and other embodiments

Figure 8:
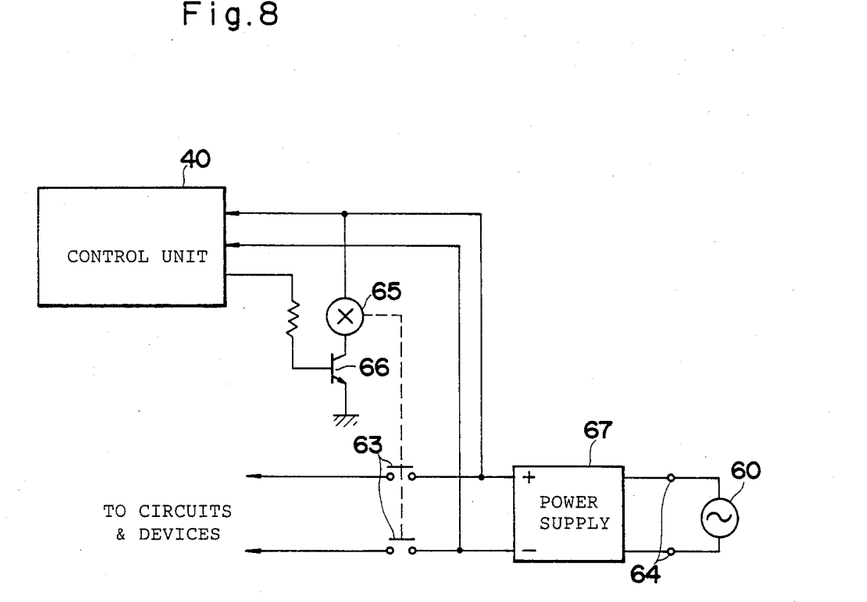
FIGS. 8 and 9 are circuit diagrams illustrating modifications of power supply circuitry.

FIG. 8 illustrates a modification of the power supply circuitry. Here the main power supply circuit 61 and auxiliary power supply circuit 62 of FIG. 6 are replaced by a single common power supply circuit 67. The arrangement is such that the power supply circuit 67 applies its output voltage directly to the control unit 40 and to components other than the control unit 40 via the contacts 63.

Figure 9:
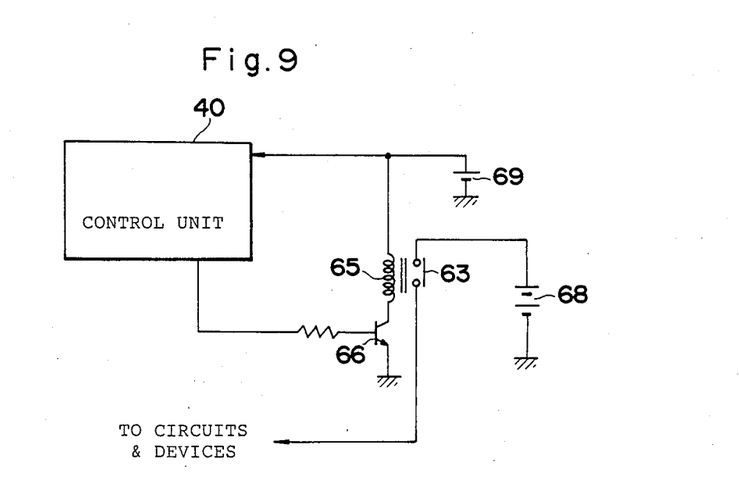

FIG. 9 illustrates yet another modification of the power supply circuitry. Here the power is assumed to be provided by a primary or secondary battery rather than a commercial power supply. Accordingly, a main DC power supply 68 and an auxiliary DC power supply 69 are provided in place of the main power supply circuit 61 and auxiliary power supply circuit 62, respectively.

It is also permissible to adopt a battery as an auxiliary power supply and employ commercial power as the main power supply.

It the above-described embodiment, the magnetic disk is restored to the origin position by turning the main power supply on (step 126). However, this processing step can be achieved by introducing power from the auxiliary power supply.

Further, in the above-described embodiment, the present invention is applied to a video signal playback apparatus. However, the invention can also be applied to the above-mentioned electronic still camera system and video magnetic recording system. In such application, the magnetic playback head 12 would be replaced by a magnetic recording/playback head or magnetic recording head, or two magnetic heads would be provided, one for recording and the other for playback.

As many apparently widely different embodiments of the present invention can be made without departing from the spirit and scope thereof, it is to be understood that the invention is not limited to the specific embodiments thereof except as defined in the appended claims.

What is claimed is:

1. A method of protecting a magnetic recording medium in a magnetic recording/playback system for recording a signal on or playing back a signal from any track of a magnetic recording medium by moving a magnetic recording/playback head radially of the magnetic recording medium while said medium is rotating, said method comprising the following steps executed by a control unit operated on electric power from an auxiliary power supply:
    (a) sensing that a main power supply, which supplies power to the magnetic recording/playback system with the exception of the control unit, is in an off state;
    (b) sensing that the magnetic recording medium has been loaded at a predetermined position;
    (c) measuring a time period over which the main power supply continues to remain in the off state and the magnetic recording medium continues to remain loaded at a predetermined position, and determining whether the measured time period has attained a predetermined time period; and
    (d) shifting the magnetic head to an origin position outside a recording/playback area of the magnetic recording medium when it is determined at said step (c) that the measured time period has attained the predetermined time period.

2. The method as defined in claim 1, further comprising a step of determining whether the magnetic head is located a the origin position, the magnetic head being shifted to the origin position when it is determined that the magnetic head is not at the origin position.

3. The method as defined in claim 1, further comprising a step of issuing a warning indication when it is determined at said step (c) that the measured time period has attained the predetermined time period.

4. In a magnetic recording/playback system for recording a signal on or playing back a signal from any track of a magnetic recording medium by moving a magnetic recording/playback head radially of the magnetic recording medium while said magnetic recording medium is rotating, an apparatus for protecting the magnetic recording medium comprising:
  control means for controlling the apparatus;
  an auxiliary power supply for supplying said control means with operating power;
  means in said control means for sensing that a main power supply, which supplies power to the magnetic recording/playback system with the exception of said control unit, is in an off state;
  means in said control means for sensing that the magnetic recording medium has been loaded at a predetermined position;
  means in said control means for measuring a time period over which the main power supply continues to remain in the off state and the magnetic recording medium continues to remain loaded at the predetermined position, and for determining whether the measured time period has attained a predetermined time period; and
  means in said control means for shifting the magnetic head to an origin position outside a recording/playback area of the magnetic recording medium when it is determined that the measured time period has attained the predetermined time period.

5. The apparatus as defined in claim 4, further comprising means in said control means for determining whether the magnetic head is located at the origin position, the magnetic head being returned to the origin poisition when it is determined that the magnetic head is not at the origin position.

6. The apparatus as defined in claim 4, further comprising means for issuing a warning indication when it is determined that the measured time period has attained the predetermined time period.

* * * * *

UNITED STATES PATENT AND TRADEMARK OFFICE
CERTIFICATE OF CORRECTION

PATENT NO. : 4,727,443

DATED : February 23, 1988

INVENTOR(S) : Izumi MIYAKE, et al.

It is certified that error appears in the above-identified patent and that said Letters Patent is hereby corrected as shown below:

Column 12, line 64, change "a" to --at--.

Signed and Sealed this

Twelfth Day of November, 1991

Attest:

HARRY F. MANBECK, JR.

Attesting Officer

Commissioner of Patents and Trademarks